April 3, 1934. E. G. STRECKFUSS 1,953,137
SLICING MACHINE
Filed April 5, 1930 3 Sheets-Sheet 1
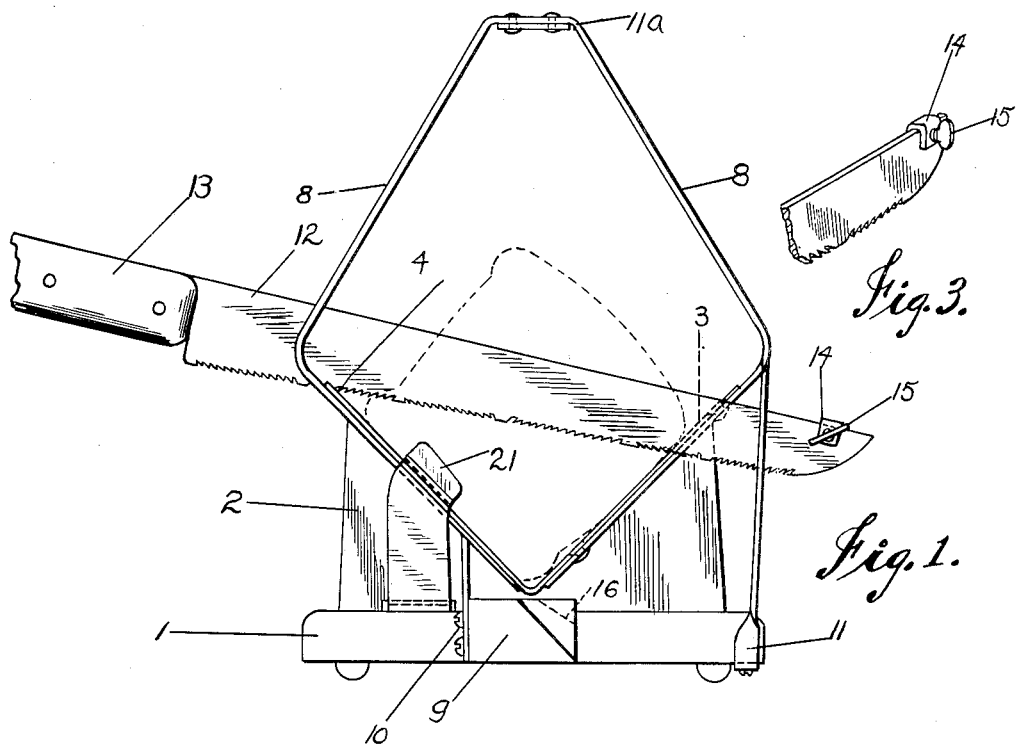
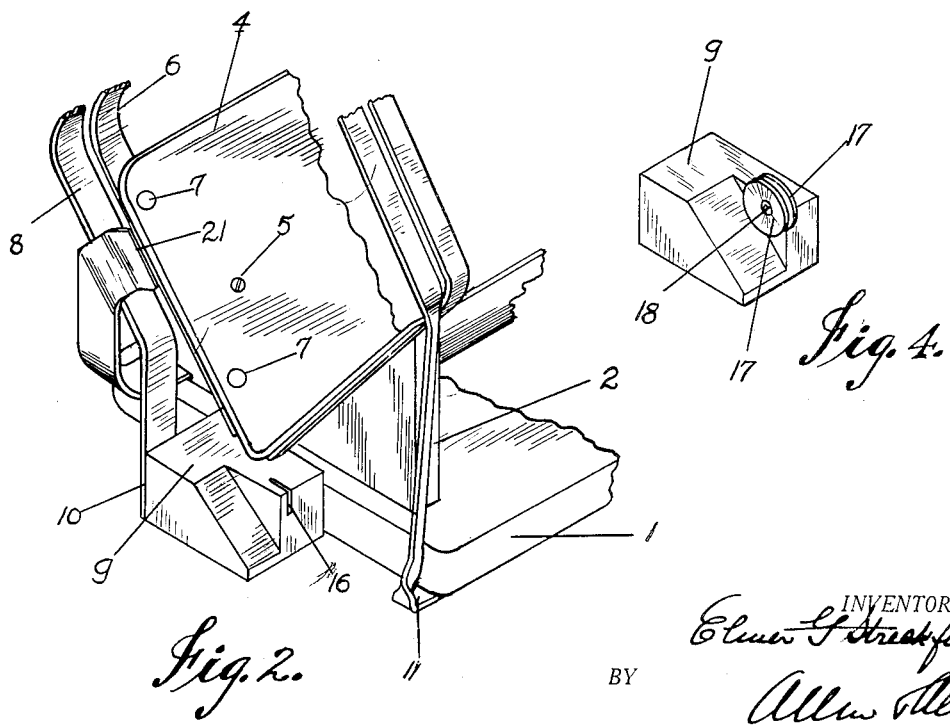
INVENTOR.
Elmer G. Streckfuss
BY
ATTORNEYS April 3, 1934.  E. G. STRECKFUSS  1,953,137
SLICING MACHINE
Filed April 5, 1930   3 Sheets-Sheet 2
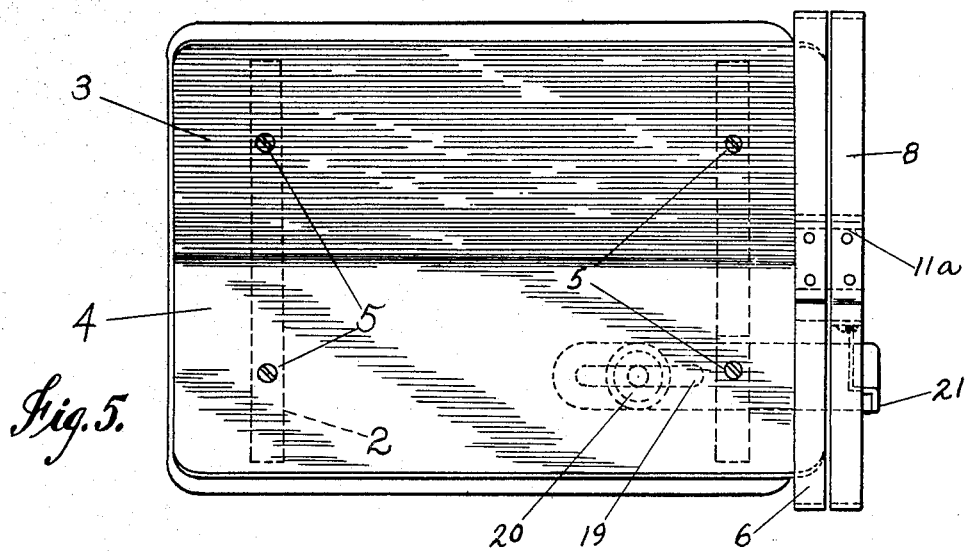
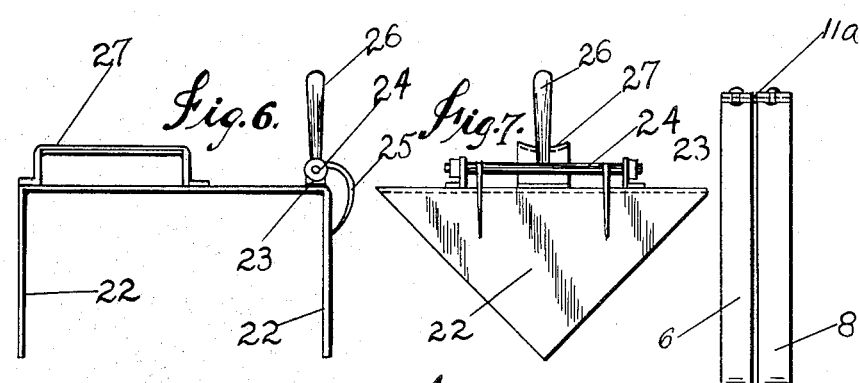
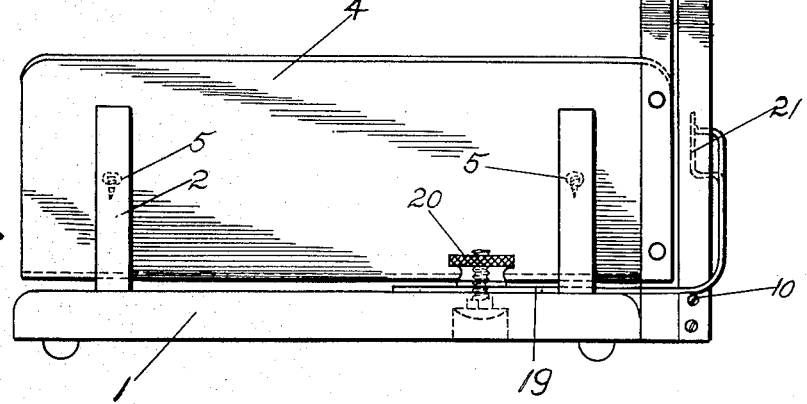
INVENTOR.
Elmer G. Streckfuss
BY
ATTORNEYS.

April 3, 1934.  E. G. STRECKFUSS  1,953,137
SLICING MACHINE
Filed April 5, 1930   3 Sheets-Sheet 3
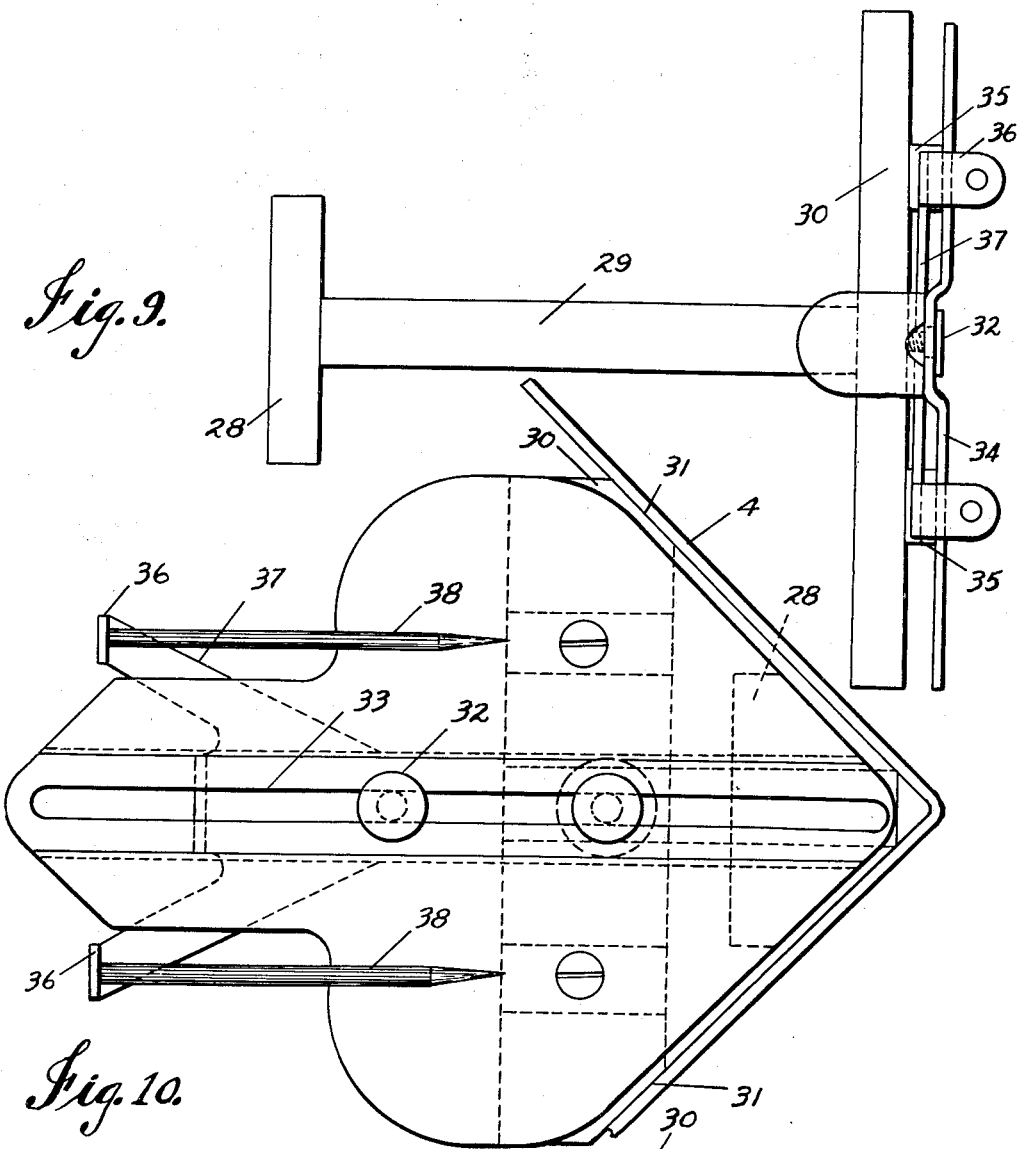
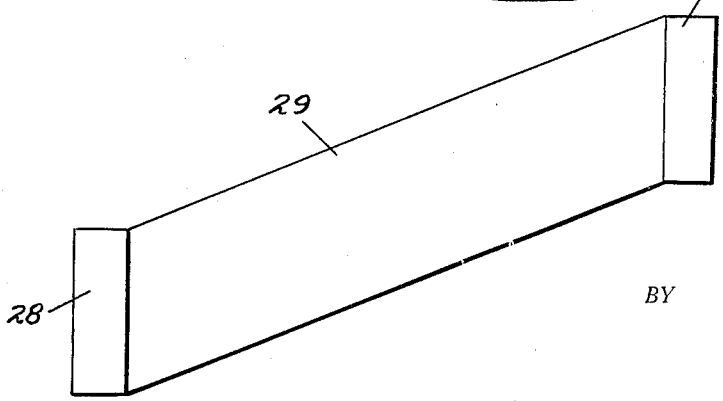
INVENTOR.
Elmer G Streckfuss
BY
ATTORNEYS

Patented Apr. 3, 1934

1,953,137

UNITED STATES PATENT OFFICE 1,953,137

SLICING MACHINE

Elmer G. Streckfuss, Cincinnati, Ohio, assignor to The Cincinnati Time Recorder Company, Cincinnati, Ohio, a corporation of Ohio Application April 5, 1930, Serial No. 441,969

7 Claims. (Cl. 146—150)

My invention relates to slicing machines particularly for bread, and to the type having a substantially straight-edged knife which cuts the article being sliced with a sawing action.

In the art, the use of bread knives having teeth which cut with a sawing action through a loaf of bread or other article, is old and well known. One particular type of knife which I find suitable for my slicing machine is disclosed in the Burns Patent 1,388,547. Also, I am advised that the use of bread trays adapted for use with bread knives has reached a limited commercial development.

It is the object of my invention to provide a slicing machine having a support for an article to be sliced, guiding members for guiding a cutting knife on both sides of the article being sliced, a slicing knife adapted for manual actuation, and a gauge for determining the thickness of a slice of the article to be made. Another object is the provision of an abutment so constructed and arranged as to not dull the knife at the limits of its stroke, and in one modification it is my object to provide an abutment so constructed as to act as a knife sharpener which automatically functions during the normal operation of the knife.

Among my objects is the provision of an attachment to be applied to the knife blade which will prevent its dislodgment from its guiding frame, and so make the operation of the slicer substantially fool-proof. A still further object of my invention is the provision of an auxiliary guiding frame and end slicer holder which will enable the user of the machine to cut a thick end slice piece without running any danger of cutting his or her fingers.

The above and other objects to which reference will be made in the ensuing disclosure, I accomplish by that certain combination and arrangement of parts of which I have shown a preferred embodiment.

Referring to the drawings:—

Figure 1 is an end elevation of the slicer.

Figure 2 is a detail perspective of the cutting end of the device, the knife not being shown.

Figure 3 is an enlarged detail view of a portion of a preferred type of knife, showing the knife retaining lug.

Figure 4 is a detail view of a modified type of knife abutment.

Figure 5 is a plan view of the device.

Figure 6 is a side elevation of a preferred type of end slice guide.

Figure 7 is an end elevation of the end slice guide shown in Figure 5.

Figure 8 is a side elevation of the slicing machine.

Figure 9 is a plan view of a preferred type of end slice grip.

Figure 10 is a front elevation of the end grip shown in Figure 9.

Figure 11 is a side elevation of the same without the end gripping plate removed.

Mounted on a suitable supporting base 1 I have shown the tray supporting legs 2 which have V-shaped cut-out portions for receiving the tray element which has a back plate 3 and a front plate 4 forming together an angular tray for receiving an article such as a loaf of bread to be sliced. In the modification illustrated, the tray is composed of an integral piece of metal bent into angular formation, and secured to the legs 2 as with screws 5 having countersunk heads.

The guiding device for the cutting knife is formed with an angular piece of metal 6 riveted to the tray as indicated at 7, 7. This piece forms the inner portion of the guide and guard. The outer portion of the guide and guard is formed by a piece of metal 8 secured in front preferably to the abutment block 9 as indicated at 10. The outer guide piece extends down parallel with part only of one side of the tray but slightly spaced from the edge of this side, and is secured to the base as indicated at 11, leaving a minor portion of the width of the tray open at the end. At the top the guides 6 and 8 are joined by a tie strap 11a which prevents the knife from being elevated out between the guides.

As the knife 12 having a handle 13 is ordinarily held at a slightly downwardly inclined angle relative to the person operating the slicer, it is of importance that clearance be provided for the outer end of the knife when it reaches a position close to the end of the cut, or otherwise the knife would strike the guide and not the abutment device provided for this purpose.

To prevent the knife from coming out of the guiding members on the return stroke of the blade, I preferably provide, as indicated in Figure 3, a member which may take the form of a channeled lug 14 having a thumb screw 15 for securing it in suitable position on the end of the blade.

The abutment block 9 illustrated in Figure 2, which is disposed below the bottom angle of the tray, may be composed of wood having a slot 16 for receiving the knife blade after the completion of a cutting stroke. In the preferred type of abutment, as shown in Figure 4, there are provided a pair of beveled discs 17 set parallel with a space between them which will receive the knife after it has completed its stroke. The discs 17 may be mounted on a spindle 18 which retains the discs in spaced position.

A gauge is provided for limiting the forward movement of the article being sliced. The gauge shown has a slotted base 19 held in adjusted position by means of the thumb nut 20 which is secured in the upper surface of the base 1. The gauge extends up to a position indicated at 21, where the advancing movement of the article being sliced will be limited and the thickness of the slice will be determined by the distance of the blocking end of the gauge from the slot between the knife guiding and guarding members.

The operation of the device will be apparent. The operator places a loaf of bread, piece of cheese, bacon, cabbage, or whatever article is to be sliced, in the tray and moves the article forward until it strikes the slice guide. If the slice is too thin or too thick, the position of the slice guide may be changed by releasing the thumb nut and adjusting the end slice gauge to a desired position. The use of calibrations, (not shown) on the slice gauge may be employed so that a user can cut a slice of a definite measured thickness, if desired.

It will also be within the scope of my invention to vary the position of the end of the slice gauge against which the article abuts so that round or irregularly shaped articles which would not abut against the gauge in the position in which it is illustrated, might be gauged by extending the gauge out into the path of the article as it is sliced.

A left handed person may also employ the device for slicing by removing the knife and setting it within the guides from the opposite side.

In the normal use of the slicer for certain articles there will remain an end slice which, if pushed against the slice gauge, might result in the user cutting his fingers. In order to provide for cutting an end slice, therefore, I have provided an auxiliary end slice holder which has spaced sliding portions 22 normally of the same shape as the bottom side of the tray. Lugs 23 are bent up from the plate forming the end slice holder and a pivot rod 24 is journaled between the lugs. The rod has curved tines 25 formed on it which by rotation of the rod will engage the end portion of an end slice. The rod 24 may be rotated by means of a handle 26. A handle 27 may be employed for manually advancing the slice holder.

In Figures 9, 10 and 11 I have illustrated a preferred type of end slice gripping mechanism. The main support for the gripping mechanism is composed of a metal piece having a bent over rear member 28, an upwardly extending arm 29, and a front supporting piece 30. The front supporting piece has beveled side portions 31 which are shaped so as to smoothly engage the sides of the tray 4. The front support 30 has a stud 32 which slidingly engages a slot 33 in a sliding plate 34. Extending forwardly from the support 30 are lugs 35 which limit the downward movement of the plate 34. Ears 36 extend upwardly from the plate 34, being supported by a Y-shaped bracket, indicated at 37. Prongs 38 extend down from the ears 36, and it will be obvious that when it is desired to cut an end slice the prongs 38 and the supporting assembly may be elevated and then brought down so that the prongs extend into the end slice from above.

Having thus described my invention, what I claim as new and desire to secure by Letters Patent, is:—

1. A hand slicing machine comprising a flat base, a receptacle with converging bottom parts between which the article is wedged for slicing, supports upstanding on said base with notches in which said receptacle is fixed, a non-dulling abutment block fixed on one end of said base, a knife guide member fixed on the adjacent end of said receptacle, and a cooperating knife guide member having one end fixed to said abutment and its other end fixed on said base laterally outward from said abutment, leaving a slice passage space over said abutment.

2. A hand slicing machine comprising a receptacle with downwardly converging side parts between which the article is wedged for slicing, and a knife guide comprising an inner member and an outer member converging upwardly above one end of the receptacle, the outer member having also a lower portion following the plane of one side part of said receptacle along a minor part of the width of said end and opening downwardly opposite the remaining major side part of the width of said end.

3. A hand slicing machine comprising a receptacle with downwardly converging side parts between which the article is wedged for slicing, a knife guide comprising an inner member and an outer member extending upwardly above one end of said receptacle, the outer member having also a lower portion following the plane of one side part of said receptacle along a minor part of the width of said end and opening downwardly opposite the remaining major side part of the width of said end, and a slice gauge at said end, confined within the laterally limits of said minor side portion of said end.

4. A hand slicing machine comprising a base, a tray, an upstanding support for said tray on said base, a knife guide at one end of said tray comprising two members, one member supported on said tray and the other member supported on said base at one side of the tray, and a knife stop below said end of the tray and attached to said base, said other side of side knife guide member also being supported by said knife stop.

5. A hand slicing machine comprising a base, a tray of V-shaped cross section supported on said base, a knife guard comprising two members, one member of inverted V-shape extending up from said tray with its sides connected to the respective sides of the tray, and the other member of V-shape in its upper part, with said upper part alined with the first member, the tops of said members being fixed together, and the second member having downward extensions from its respective sides, near respective sides of the tray, and fixed to said base.

6. A hand slicing machine comprising a base, a tray of V-shaped cross section supported on said base, a knife guard comprising two members arching over the space at the end of the tray, one with its sides connected to the respective sides of the tray and the other member having downward extensions from its respective sides, fixed to said base near respective sides of the tray.

7. A hand slicing machine comprising a base, a tray of V-shaped cross section supported on said base, a knife guard comprising two members arching over the space at the end of the tray, one with its sides connected to the respective sides of the tray and the other member having downward extensions from its respective sides, one extension inclining in partly across the end of the tray and the other extension being directed substantially away from the respective side of the tray.

ELMER G. STRECKFUSS.